(12) United States Patent
Park et al.

(10) Patent No.: US 10,465,123 B2
(45) Date of Patent: Nov. 5, 2019

(54) METHOD FOR INCREASING COKE-OVEN GAS

(71) Applicants: POSCO, Pohang-si (KR); Research Institute of Industrial Science and Technology, Pohang-si (KR)

(72) Inventors: Joo Hyoung Park, Pohang-si (KR); Chang Houn Rhee, Pohang-si (KR)

(73) Assignees: POSCO, Pohang-si (KR); Research Institute of Industrial Science and Techn, Pohang-si (KR)

( * ) Notice: Subject to any disclaimer, the term of this patent is extended or adjusted under 35 U.S.C. 154(b) by 534 days.

(21) Appl. No.: 14/429,221

(22) PCT Filed: Oct. 4, 2012

(86) PCT No.: PCT/KR2012/008050
§ 371 (c)(1),
(2) Date: Mar. 18, 2015

(87) PCT Pub. No.: WO2014/046329
PCT Pub. Date: Mar. 27, 2014

(65) Prior Publication Data
US 2015/0218458 A1    Aug. 6, 2015

(30) Foreign Application Priority Data
Sep. 24, 2012  (KR) .................. 10-2012-0105766

(51) Int. Cl.
C10B 57/12    (2006.01)
C10B 57/18    (2006.01)
C10B 45/00    (2006.01)

(52) U.S. Cl.
CPC .............. *C10B 57/12* (2013.01); *C10B 45/00* (2013.01); *C10B 57/18* (2013.01); *Y02P 20/129* (2015.11)

(58) Field of Classification Search
CPC ......... C10B 57/18; C10B 57/12; C10B 43/00; C10B 43/02; C10B 43/14; C10B 57/00;
(Continued)

(56) References Cited

U.S. PATENT DOCUMENTS 711,905 A  * 10/1902  Lowe .................... C10B 21/00
                                                        201/27
3,964,976 A  *  6/1976  Pettrey, Jr. ............. C10B 43/02
                                                         201/2

FOREIGN PATENT DOCUMENTS

DE        1006110 B     4/1957
FR         970752 A  *  1/1951  ............ C10B 43/02
(Continued)

OTHER PUBLICATIONS

Patent Office's human translation of FR 970,752.*
(Continued)

*Primary Examiner* — Jonathan Miller
*Assistant Examiner* — Jonathan Luke Pilcher
(74) *Attorney, Agent, or Firm* — The Webb Law Firm

(57) ABSTRACT

Provided is a method of increasing an amount of coke-oven gas, including the step of: introducing steam into a gas way of a carbonization chamber of a coke oven such that a water-gas reaction is conducted at 500° C. or higher during a process of carbonizing coal in the carbonization chamber of the coke oven, wherein the starting point of steam into the gas way is moved up prior to a time point at which an amount of generation of coke-oven gas is maximized, so as to increase the steam introduction time, thereby maximizing a reaction of steam with carbon existing in the carbonization chamber of the coke oven.

7 Claims, 3 Drawing Sheets

(58) Field of Classification Search
CPC .... C10B 5/00; C10B 5/02; C10B 5/04; C10B 5/06; C10B 5/08; C10B 5/10; C10B 5/12; C10B 5/14; C10B 5/16; C10B 5/18; C10B 5/20; C10B 15/00; C10B 15/02; C10K 3/04
USPC ........................................................ 201/38
See application file for complete search history.

(56) References Cited

FOREIGN PATENT DOCUMENTS

| | | |
|---|---|---|
| JP | 03-212487 | 9/1991 |
| JP | 06172755 A | 6/1994 |
| JP | 09263763 A | 10/1997 |
| JP | 10-287879 | 10/1998 |
| JP | 2000144142 A | 5/2000 |
| JP | 2000219883 A | 8/2000 |
| JP | 2000273473 A | 10/2000 |
| JP | 200382355 A | 3/2003 |
| KR | 10-2011-0076106 A | 7/2011 |

OTHER PUBLICATIONS

"water Gas Reaction", digipac.ca, Sep. 26, 2010 (date obtained from Wayback Machine), Available Online at: http://www.digipac.ca/chemical/mtom/contents/chapter4/watergas.htm (Year: 2010).*

* cited by examiner

[FIG.1]
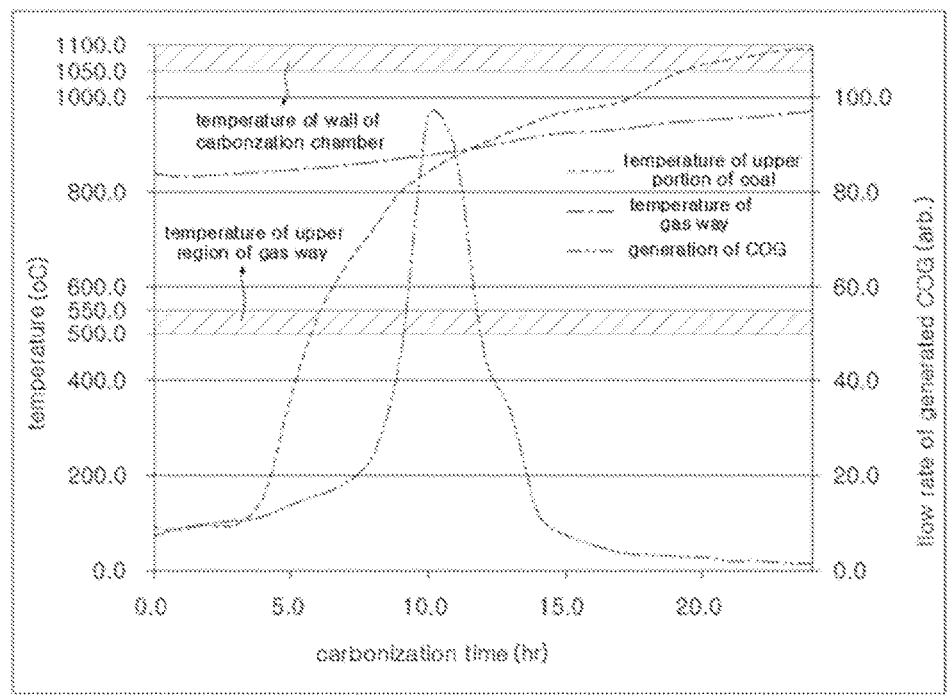

[FIG.2]
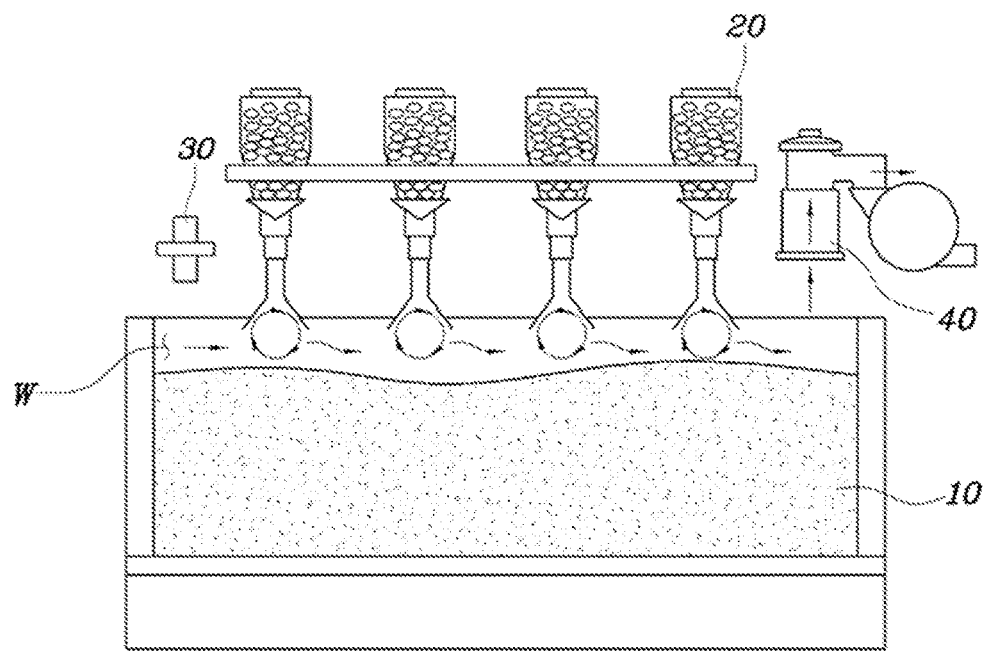

[FIG. 3]
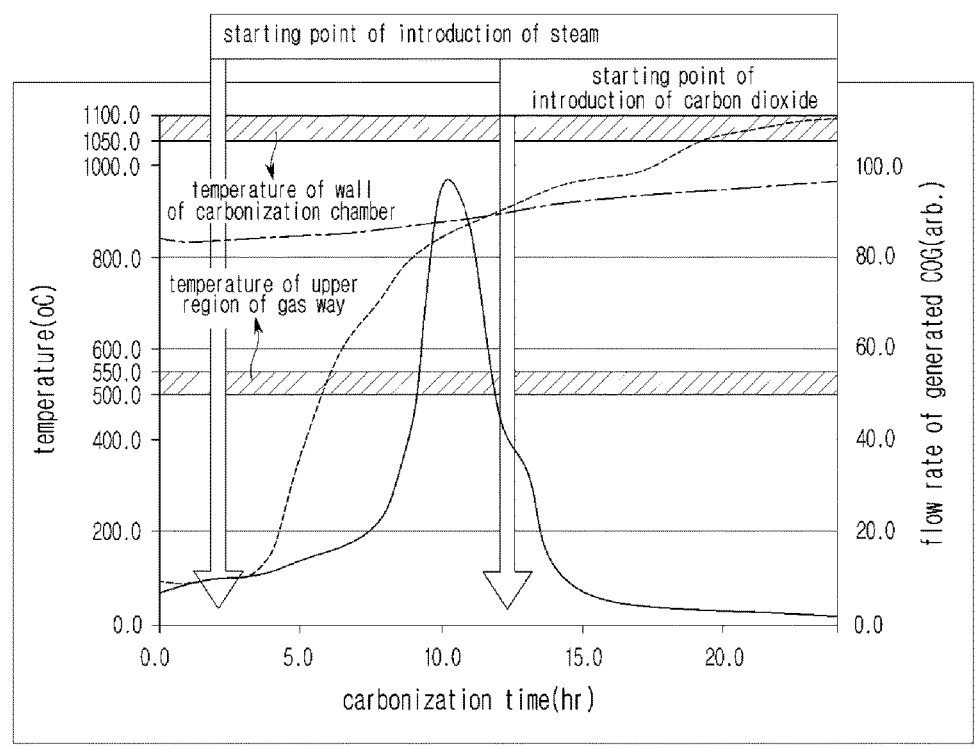

METHOD FOR INCREASING COKE-OVEN GAS

CROSS-REFERENCE TO RELATED APPLICATIONS

This application is the United States national phase of International Application No. PCT/KR2012/008050 filed Oct. 4, 2012, and claims priority to Korean Patent Application No. 10-2012-0105766 filed Sep. 24, 2012, the disclosures of which are hereby incorporated in their entirety by reference.

TECHNICAL FIELD

The present invention relates a method of increasing the amount of coke-oven gas, and, more particularly, to a method of increasing the amount of coke-oven gas by optimizing the starting point of introduction of steam into a gas way in a carbonization chamber of a coke oven and thus increasing the introduction time of the steam into the gas way.

BACKGROUND ART

A coke oven is an apparatus for preparing coke by carbonizing coal (raw material) at high temperature. In the coke oven, coal is charged in a carbonization chamber, heated to 1100° C.~1340° C. and then maintained at the same temperature for a predetermined time to carbonize the coal. Here, in order to maintain such a temperature state, air and fuel gas are supplied into a combustion chamber.

A coke oven is equipped with a plurality of independent carbonization chambers, and each of the carbonization chambers is provided with a gas rising pipe.

Such a coke oven generates coke-oven gas (COG), which is a volatile gas, during the process of carbonizing the coal stored in each carbonization chamber. This coke-oven gas is discharged through the gas rising pipe of the coke oven.

The coke-oven gas discharged through the gas rising pipe of the coke oven includes a large amount of environmental pollutants, such as dust, tar and the like, together with volatile materials. In order to remove such environmental pollutants, generally, they are collected in a gas collection pipe, and then sent into a post-treatment process.

Meanwhile, coke-oven gas is mostly reused as fuel in an iron mill by a refining process. With the increase in the usage of coke-oven gas, methods of increasing the usage of coke-oven gas have recently been researched and developed.

In relation to such research and development, various conventional technologies are disclosed.

Japanese Unexamined Patent Application Publication No. 2000-144142 (2000 May 26) discloses "a method of removing carbon attached to a carbonization chamber of a coke oven".

This method is a technology of removing carbon attached to a carbonization chamber of a coke oven by injecting a gas mixture including carbon dioxide and steam into the carbonization chamber, and is characterized in that carbon dioxide (steam) and air is alternately provided in order to prevent the extreme rise and fall of temperature in the carbonization chamber at the time of gas injection.

Further, Korean Patent Registration No. 10-1082127 (2011 Nov. 3), filed and registered by the present inventor, discloses "a method of increasing the amount of coke-oven gas using carbon dioxide". This method is a technology of increasing the amount of coke-oven gas by reacting high-temperature carbon with carbon dioxide and water using the waste heat generated from a coke oven, and is characterized in that carbon dioxide, water or a mixture thereof (gasifying agent) was supplied into a gas way in a carbonization chamber of a coke oven, and thus the gasifying agent reacts with carbon in the carbonization chamber, thereby increasing the amount of coke-oven gas.

The above-mentioned conventional technologies disclose methods of increasing the amount of coke-oven gas as well as recovering waste heat from coke-oven gas by injecting carbon dioxide and water into a coke oven to induce an endothermic reaction with high-temperature carbon.

However, the present inventor ascertained that various problems occurred when the amount of coke-oven gas was increased by the conventional technologies.

In order to confirm the above problems, the present inventor made experiments on the change in temperature of a gas way located at the upper portion of a carbonization chamber of a coke oven and the change in amount of generation of coke-oven gas over time, assuming that the operation time of the coke oven in one cycle is set to 24 hours. The results thereof are shown in FIG. 1.

As shown in FIG. 1, it can be ascertained that the temperature of the gas way located at the upper portion of the carbonization chamber was maintained at 500° C.~1100° C. and that the amount of generation of coke-oven gas started to increase rapidly in about 6 hours, was maximized in about 10 hours, and decreased rapidly in about 13.5 hours. These numerical results may be changed by various factors, such as rate of temperature increase, structure of a coke oven, amount of charged raw material, etc., but the forms of generation of coke-oven gas are similar to each other.

According to this change in amount of generation of coke-oven gas, carbon dioxide must be introduced when the amount of generation of coke-oven gas is less than the average amount thereof. Therefore, when carbon dioxide is introduced therebefore, there is a problem in that it moves together with coke-oven gas in the gas way, so the effective residence time thereof in the gas way is insufficient, and thus the reaction time thereof with carbon in the gas way is also insufficient.

That is, a predetermined level of residence time can be secured only when carbon dioxide is introduced in 14 hours, and an endothermic reaction of carbon dioxide with carbon attached to a coke oven occurs even when the temperature of coal charged in the coke oven reaches 800° C. or higher. Therefore, there occurs a problem that a carbonization region, which can be used at the time of a reaction of carbon dioxide and carbon, is limited to a predetermined region.

Meanwhile, for the purpose of treating coke-oven gas, a coke-oven gas treatment system is disposed at the rear end of a coke oven. Here, when the amount of coke-oven gas is increased by the introduction of carbon dioxide, a part of unreacted carbon dioxide is introduced into a hydrogen sulfide ($H_2S$) removal system to remove $H_2S$, whereas most of unreacted carbon dioxide is supplied to a subsequent process to remove combustible components from coke-oven gas, thus lowering calorific value. Further, in this case, carbon dioxide, instead of $H_2S$, is removed by the hydrogen sulfide ($H_2S$) removal system itself, thus lowering $H_2S$ removal efficiency.

It is to be understood that the foregoing description is provided to merely aid the understanding of the present invention, and does not mean that the present invention falls under the purview of the related art which was already known to those skilled in the art.

Accordingly, the present invention has been made to solve the above-mentioned problems, and an object of the present invention is to provide a method of increasing the amount of coke-oven gas, wherein the amount of generation of coke-oven gas can be increased by optimizing the starting point of introduction of steam, the reaction rate of steam with carbon being higher than the reaction rate of carbon dioxide with carbon, into a coke oven and thus maximizing the reaction time of steam with carbon in the coke oven.

SUMMARY OF THE INVENTION

In order to accomplish the above object, an aspect of the present invention provides a method of increasing an amount of coke-oven gas, including the step of: introducing steam into a gas way of a carbonization chamber of a coke oven such that a water-gas reaction is conducted at 500° C. or higher during a process of carbonizing coal in the carbonization chamber of the coke oven, wherein the starting point of introduction of steam into the gas way is moved up prior to a time point at which an amount of generation of coke-oven gas is maximized, so as to increase the steam introduction time, thereby maximizing a reaction of steam with carbon existing in the carbonization chamber of the coke oven.

Assuming that carbonization time in the coke oven is 24 hours, steam may be introduced after 2 hours from carbonization start point.

Tar generated in the early stage of carbonization may be removed by the following Reaction Formula: Tar+ $H_2O \rightarrow CO+CH_4+H_2$, and the effective residence time ($\tau$) of steam may be determined by dividing the effective volume of the gas way by the total amount of the introduced steam and the generated coke oven.

The collision frequency of the carbon existing in the carbonization chamber of the coke oven and the steam introduced into the gas way may be increased.

The collision frequency of the carbon existing in the carbonization chamber of the coke oven and the steam introduced into the gas way may be expressed by a collision frequency factor (A), and the collision frequency factor (A) may be determined in consideration of the structure of the gas way and the flow of the steam.

The conversion ratio (X) of the introduced steam into coke-oven gas may be represented by the following Formula:

$$X=[1-1/(Ae^{-E/RT}*\tau)]^{1/n}$$

(E: activation energy (J/mol), R: 8.3144 (J/mol*K), T: reaction temperature (K), n: reaction order).

The amount of introduction of steam may be changed according to the effective residence time of steam and the reaction temperature.

The effective residence time of steam may be changed according to the introduction position of steam and the introduction manner of steam.

The introduced steam may react with carbon existing in the carbonization chamber of the coke oven by the following Formula:

$$C+H_2O \rightarrow H_2+CO,$$

and the relation among the total production (P) of reducing gas ($H_2+CO$), the conversion ratio (X) of steam and the amount ($F_{H2O}$) of introduced steam may be represented by the following Formula:

$$P=2*\Sigma X*F_{H2O}*t$$

(P: total reducing gas production ($Nm^3$), $F_{H2O}$: steam introduction amount ($Nm^3$/min), t: steam introduction time (min)).

The relation between the conversion ratio (X) of the introduced steam into coke-oven gas and the partial pressure of the steam existing in the carbonization chamber of the coke oven may be represented by the following Formula:

$$dX/dt=Ae^{-E/RT}(P_{H2O})^n(1-X)$$

(E: activation energy (J/mol), R: 8.3144 (J/mol*K), T: reaction temperature (K), n: reaction order).

Oxygen may be supplied into the carbonization chamber of the coke oven before the steam is introduced into the gas way.

The steam may be introduced into the gas way of the carbonization chamber of the coke oven while it is preheated by waste heat discharged from a gas rising pipe provided on the carbonization chamber.

The present invention can exhibit the following advantages thanks to the above technical configuration.

First, steam introduction time can be increased because steam can be introduced before the amount of generation of coke-oven gas in a carbonization chamber of a coke oven is maximized.

Second, thanks to the increase in steam introduction time, the amount of generation of coke-oven gas can be increased several times compared to when a conventional coke oven using carbon dioxide is used.

Third, tar generated in the early stage of carbonization reacts with steam to be converted into hydrogen and carbon monoxide, and thus the burden of a tar removal process can be reduced.

Fourth, a problem of a $H_2S$ removal rate being reduced due to the introduction of carbon dioxide can be solved.

Fifth, a steam conversion rate can be calculated by using the residence time of steam in a gas way of a carbonization chamber of a coke oven.

Sixth, the total production of reducing gas can be calculated by using the steam conversion rate.

DESCRIPTION OF DRAWINGS

FIG. 1 is a graph showing the change in amount of coke-oven gas generated from a coke oven over time.

FIG. 2 is a schematic view showing a coke oven for realizing the method of increasing the amount of coke-oven gas according to the present invention.

FIG. 3 is a graph showing the starting point of introduction of steam in the method of increasing the amount of coke-oven gas according to the present invention.

DESCRIPTION OF THE INVENTION

Hereinafter, preferred embodiments of the present invention will be described in detail with reference to the accompanying drawings.

As shown in FIG. 2, the method of increasing the amount of coke-oven gas according to the present invention is carried out by a coke oven including a carbonization chamber 10, a combustion chamber (not shown), a coke supply unit 20, a steam introduction pipe 30 and a gas rising pipe 40. Detailed descriptions of these constituents will be omitted because they are the same as those disclosed in Korean Patent Registration No. 1082127. A gas way is defined by the space located between the upper surface of the charged coal and the inner side of the upper portion of the carbonization chamber 10.

However, it is preferred that the steam introduction pipe 30 be disposed at a side of the carbonization chamber 30 provided at the opposite side thereof with the gas rising pipe 40, the side being far away from the opposite side thereof. That is, the steam introduction pipe 30 is disposed in this way in order to secure sufficient residence time and sufficient reaction time while steam moves to the gas rising pipe 40 through a gas way (W) of the carbonization chamber 10.

The method of increasing the amount of coke-oven gas according to the present invention is characterized in that steam is introduced into a gas way of a carbonization chamber of a coke oven such that a water-gas reaction is conducted at 500° C. or higher during a process of carbonizing coal in the carbonization chamber of the coke oven, so the effective residence time of steam increases, thereby maximizing the reaction time of steam with carbon existing in the carbonization chamber of the coke oven.

When steam is introduced under the condition of lower than 500° C., thermodynamically, a reaction does not easily take place.

As above, high-temperature waste heat can be efficiently recovered by a water-gas reaction corresponding an endothermic reaction at 500° C. or higher, and a carbonization region capable of introducing steam is enlarged, thus remarkably increasing the amount of coke-oven gas.

As shown in FIG. 1, when the carbonization time in a coke oven is set to 24 hours, the temperature of the gas way located at the upper portion of the carbonization chamber is maintained at 500° C.~1100° C., and the amount of generation of coke-oven gas starts to increase rapidly in about 6 hours from the carbonization start point, is maximized in about 10 hours therefrom, and decreases rapidly in about 13.5 hours therefrom. These numerical results may be changed by various factors, such as rate of temperature increase, structure of a coke oven, amount of charged raw material, etc., but the forms of generation of coke-oven gas are similar to each other.

According to the pattern of generation of coke-oven gas over carbonization time, in order to increase the amount of coke-oven gas by the introduction of carbon dioxide into a coke oven, sufficient carbon dioxide residence time can be secured only after the lapse of at least 13.5 hours from carbonization start point, so there is a problem that the starting point of introduction of carbon dioxide is limited. That is, since coke-oven gas generated in a coke oven moves toward a gas rising pipe through the gas way, when carbon dioxide is introduced at the carbonization time region in which the amount of generation of coke-oven gas rapidly increases, there is a problem that the effect of increasing the amount of coke-oven gas is reduced in half because the residence time of carbon dioxide in the coke oven and the reaction time of carbon dioxide with carbon existing in the carbonization chamber are very short.

In the method of increasing the amount of coke-oven gas according to the present invention, steam is introduced into the gas way in a carbonization chamber of a coke oven before the amount of coke-oven gas generated in the process of carbonizing coal in the carbonization chamber of the coke oven is maximized, so steam introduction time is increased, thus maximizing the reaction time of steam with carbon existing in the carbonization chamber of the coke oven and solving the problem caused by the introduction of carbon dioxide. That is, the reaction temperature of steam and carbon is lower than the reaction temperature of carbon dioxide and carbon, and the reaction rate of steam and carbon is higher than the reaction rate of carbon dioxide and carbon, thereby advancing the starting point of introduction of steam.

As shown in FIG. 3, according to the present invention, assuming that carbonization time in the coke oven is 24 hours, steam can be introduced after 2 hours from the carbonization start point, if the temperature in the gas way is 500° C. or higher.

Generally, the temperature in the gas way reaches 500° C.~1100° C. However, for the reaction of steam with carbon (about 500° C.) attached to the inner side of the upper portion of the carbonization chamber of the coke oven, steam must be introduced at 500° C. or higher.

When the carbonization time is about 2 hours, water contained in the charged coal is almost volatilized, and thus the optimal reaction efficiency can be expected according the introduction of steam. However, when steam is introduced before 2 hours from the carbonization start point, there is a problem in that the reaction efficiency is reduced in half because coal contains water.

Since the reaction rate of steam with carbon is higher than that of carbon dioxide with carbon, the generation of coke-oven gas increases rapidly. Therefore, although the flow rate of coke-oven gas in the gas way increases, steam reacts with carbon existing in the gas way before it comes out of the gas way, and thus the starting point of introduction of steam can be advanced before the generation of coke-oven gas is maximized.

Further, since the reaction temperature of steam with carbon is lower than that of carbon dioxide with carbon, steam can be introduced when the temperature in the gas way is higher than 500° C.

The present inventor recognized that the reaction of steam with carbon takes place at low temperature compared to the reaction of carbon dioxide with carbon and that the reaction rate of steam with carbon is higher than the reaction rate of carbon dioxide with carbon by three or more times. Based on these recognitions, steam was introduced after 2 hours from the carbonization start point, and thus the steam introduction time, which was two times longer than a conventional carbon dioxide introduction time, was secured. Consequently, it can be ascertained that steam can be introduced to such a degree that the moles of steam is about six times those of carbon dioxide.

Further, according to the present invention, tar generated in the early stage of carbonization reacts with steam to be converted into hydrogen and carbon monoxide, and thus the burden of a tar removal process can be reduced.

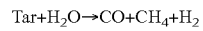

$$Tar + H_2O \rightarrow CO + CH_4 + H_2$$

Based on these facts, the present inventor made experiments on the reactivity of carbon dioxide and steam with high-temperature carbon according to reaction temperature and residence time.

The conversion rates of steam and carbon dioxide were evaluated while changing the reaction temperature in a tester partially filled with carbon to 800° C. and 900° C. and changing the residence time of steam and carbon dioxide in the tester to 30 seconds and 1 minute.

In this case, nitrogen was used as balance gas for residence time control, and steam and carbon dioxide were introduced at a flow rate of 6 L/hr. The results thereof (reactivity (conversion rate)) are given in Table 1 below.

TABLE 1

| Reaction temperature (° C.) | Residence time (sec) | Steam conversion rate (%) | Carbon dioxide conversion rate (%) |
|---|---|---|---|
| 800 | 30 | 60 | 30 |
|  | 60 | 70 | 40 |
| 900 | 30 | 80 | 60 |
|  | 60 | 90 | 70 |

As given in Table 1 above, it can be ascertained that the conversion rate of carbon dioxide is 60% or less under the conditions of a reaction temperature of lower than 900° C. and a residence time of shorter than 60 seconds. Therefore, there is a serious problem in treating the remaining carbon dioxide.

In contrast, it can be ascertained that the conversion rate of steam is about two times that of carbon dioxide at low temperature and that, considering the temperature of a coke oven, the introduction time of steam is about two times that of carbon dioxide. Therefore, it can be ascertained that the coke-oven gas increment attributable to steam is about four times the coke-oven gas increment attributable to carbon dioxide.

Meanwhile, in the method of increasing the amount of coke-oven gas according to the present invention, the conversion rate of steam can be improved by maximizing the effective residence time of steam, this effective residence time thereof being obtained by dividing the effective volume of a gas way by the total amount of introduced steam and generated coke oven gas, and further can be improved by increasing the collision frequency of the carbon existing in the carbonization chamber of the coke oven and the steam introduced into the gas way.

The collision frequency of the carbon existing in the carbonization chamber of the coke oven and the steam introduced into the gas way is expressed by a collision frequency factor (A), and the collision frequency factor (A) is an optional value determined by the structure of the gas way, the flow of steam, the charging of carbon, attaching structure or the like.

The present inventor found a steam conversion rate and various factors influencing the steam conversion rate, and analyzed the relation among these factors, thus deducing the specific correlation among the above factors. This specific correlation is represented by the following Formula 1:

$$X=[1-1/(Ae^{-E/RT}*\tau)]^{1/n}$$

wherein X represents a steam conversion rate, and the range thereof is 0~1.

$\tau$ represents effective residence time of steam in a gas way, and is obtained by dividing the effective volume ($Nm^3$) of a gas way by the total flow rate ($Nm^3$/sec) of steam and coke-oven gas. Substantially, this effective residence time of steam corresponds to the reaction time of steam with carbon in a coke oven, and its value is 1~300 seconds.

This effective residence time of steam may be determined by the introduction position and introduction manner of steam.

A is a collision frequency factor ($sec^{-1}$) representing the collision frequency of steam and carbon, and is determined by the structure of the gas way, the flow of steam, the charging of carbon, attaching structure or the like. The value thereof is 102~108.

E represents activation energy (J/mol) for a reaction of steam and carbon (compounded coal, attached carbon, sponge carbon, coke or the like), and its value is 10000~200000.

R represents an ideal gas constant (J/mol*K), and its value is 8.3144.

T represents a reaction temperature (K), and its value is 800~1400.

n represents a reaction order, and its value is 0.5~1. n depends on the kind of carbon (compounded coal, attached carbon, sponge carbon, coke or the like).

As such, the conversion rate of steam can be maximized by optimizing various factor values using Formula 1 above.

According to Formula 1 above, the efficiency of increasing the amount of coke-oven gas can be optimized by changing the amount of introduction of steam according to the effective residence time of steam and the reaction temperature.

Meanwhile, the introduced steam reacts with carbon existing in the carbonization chamber of the coke oven by the following reaction Formula: $C+H_2O \rightarrow H_2+CO$, and the relation among the total production (P) of reducing gas ($H_2+CO$), the conversion ratio (X) of steam and the amount ($F_{H2O}$) of introduced steam is represented by the following Formula 2:

$$P=2*\Sigma X*F_{H2O}*t$$

(P: total reducing gas production ($Nm^3$), $F_{H2O}$: steam introduction amount ($Nm^3$/min), t: steam introduction time (min)).

According to Formula 2 above, since the conversion rate of steam influences the total production of reducing gas (coke oven gas), the factors of Formula 1 above influencing the conversion rate of steam may influence the total production of reducing gas.

Since the above-mentioned steam conversion rate and steam introduction amount are changed according to the reaction temperature range, the total production of reducing gas can be calculated by adding up all the values corresponding to each range.

$$dX/dt=Ae^{-E/RT}(P_{H2O})^n(1-X) \quad \text{[Formula 3]}$$

($P_{H2O}$: partial pressure of steam in a coke oven, other factors are the same as those explained in Formula 1 above)

As represented by Formula 3 above, since the conversion rate of steam can be controlled according to the partial pressure of steam in the coke oven, t of Formula 3 above represents the residence time of steam in a gas way of a coke oven, and its value is present between 0 and $\tau$.

Meanwhile, the method of increasing the amount of coke oven gas according to the present invention is characterized in that oxygen is supplied into the carbonization chamber of the coke oven before the steam is introduced the gas way.

The supplied oxygen reacts with carbon or a carbon compound to generate carbon dioxide, carbon monoxide, hydrogen and water. Here, since this reaction is an exothermic reaction, it prevents the temperature in the gas way of the carbonization chamber of the coke oven from being lowered.

Further, the temperature of steam introduced into the gas way of the carbonization chamber of the coke oven must be maintained constant. Therefore, when water, not steam, is supplied into the coke oven, the temperature in the carbonization chamber is lowered, and thus steam, not water, must be supplied into the coke oven.

The method of increasing the amount of coke oven gas according to the present invention is further characterized in that waste heat discharged from a gas rising pipe is recovered, steam is preheated by this waste heat, and then the preheated steam is supplied into the gas way of the carbonization chamber of the coke oven.

For example, when the gas rising pipe is surrounded by a heat exchange unit (pipe or the like), steam (or water) passes through the heat exchange unit to absorb the waste heat discharged from the gas rising pipe and to preheat the steam, and then the preheated steam is supplied into the gas way in the carbonization chamber of the coke oven, there are advantages that the steam having constant temperature can be easily supplied and the waste heat discharged from the gas rising pipe can be efficiently recovered.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

REFERENCE NUMERALS

10: carbonization chamber
20: coke supply unit
30: steam introduction pipe
40: gas rising pipe
W: gas way

The invention claimed is:

1. A method of increasing an amount of coke-oven gas, comprising the step of:
    introducing steam into a carbonization chamber of a coke oven containing charged coal, wherein the steam passes from a first end of the carbonization chamber to a gas rising pipe at a second end of the carbonization chamber through a gas way defined by a space located between an upper surface of the charged coal and an inner side of an upper portion of the carbonization chamber to remove carbon attached on the inner side of the upper portion of the carbonization chamber and transform the steam to coke-oven gas using the attached carbon such that a water-gas reaction is conducted at 500° C. or higher during a process of carbonizing coal in the carbonization chamber of the coke oven,
    wherein steam is introduced into the carbonization chamber prior to a time when a flow rate of coke-oven gas generated during the carbonization of the coal in the carbonization chamber reaches a maximum and is continuously introduced until a time when the flow rate of coke-oven gas generated during the carbonization of the coal in the carbonization chamber has decreased from the maximum,
    wherein the steam reacts with the carbon according to the formula $C + H_2O \rightarrow H_2 + CO$, and the following formulas are used to determine and adjust the flow rate of steam ($F_{H2O}$) that is introduced:

$X = [1 - 1/(Ae^{-E/RT} * \tau)]^{1/n}$, wherein
        X: conversion rate at which the reaction with carbon present in the carburizing chamber takes place;
        A: collision frequency factor (sec.$^{-1}$),
        E: activation energy (J/mol),
        R: 8.3144 (J/mol*K),
        T: reaction temperature (K),
        $\tau$: effective residence time (sec.), and
        n: reaction order, and $P = 2 * \Sigma X * F_{H2O} * t$, wherein
        P: total $H_2$+CO production (Nm$^3$),
        $F_{H2O}$: steam introduction amount (Nm$^3$/min), and
        t: steam introduction time (min.), and
    wherein the conversion ratio (X) is 0-1,
    wherein the carbonization time in the coke oven is 24 hours and steam is introduced after 2 hours from a carbonization start point,
    wherein the effective residence time ($\tau$) of steam is determined by dividing the effective volume of the gas way by the total flow rate of the introduced steam and the generated coke oven gas and is 1-300 seconds.

2. The method of claim 1, wherein the collision frequency of the carbon existing in the carbonization chamber of the coke oven and the steam introduced into the carbonization chamber is expressed by a collision frequency factor (A) which is 102-108 sec$^{-1}$, and wherein the collision frequency factor (A) is determined based on the structure of the gas way and the flow rate of the steam.

3. The method of claim 1, wherein the amount of introduction of steam is changed according to the effective residence time of steam and the reaction temperature.

4. The method of claim 1, wherein the effective residence time of steam is changed according to the introduction position of steam and the introduction manner of steam.

5. The method of claim 1, wherein oxygen is supplied into the carbonization chamber of the coke oven before the steam is introduced into the carbonization chamber.

6. The method of claim 1, wherein the steam is introduced into the carbonization chamber of the coke oven while it is preheated by waste heat discharged from a gas rising pipe provided on the carbonization chamber.

7. The method of claim 1, wherein tar generated in the early stage of carbonization is removed by the following Reaction Formula: $Tar + H_2O \rightarrow CO + CH_4 + H_2$.

* * * * *

UNITED STATES PATENT AND TRADEMARK OFFICE
CERTIFICATE OF CORRECTION

PATENT NO. : 10,465,123 B2
APPLICATION NO. : 14/429221
DATED : November 5, 2019
INVENTOR(S) : Joo Hyoung Park et al.

Page 1 of 1

It is certified that error appears in the above-identified patent and that said Letters Patent is hereby corrected as shown below:

In the Claims

Column 10, Lines 3-4, Claim 1, delete "$X=[1-1/(Ae^{-E/RT}*\tau)]^{1/n}$," and insert
-- $X = [1-1/(Ae^{-E/RT}* \tau)]^{1/n}$, --

Signed and Sealed this
Eighteenth Day of February, 2020

Andrei Iancu
*Director of the United States Patent and Trademark Office*